United States Patent
Arciga et al.

(10) Patent No.: US 12,351,998 B2
(45) Date of Patent: Jul. 8, 2025

(54) ELECTRICALLY-OPERATED BARRIER TRANSFER MACHINE

(71) Applicant: Lindsay Transportation Solutions, Omaha, NE (US)

(72) Inventors: Manuel Arciga, Elkhorn, NE (US); Matthew A. Elmore, Rio Vista, CA (US)

(73) Assignee: Lindsay Transportation Solutions, LLC, Omaha, NE (US)

(*) Notice: Subject to any disclaimer, the term of this patent is extended or adjusted under 35 U.S.C. 154(b) by 245 days.

(21) Appl. No.: 18/326,498

(22) Filed: May 31, 2023

(65) Prior Publication Data
US 2023/0392332 A1   Dec. 7, 2023

Related U.S. Application Data

(60) Provisional application No. 63/347,593, filed on Jun. 1, 2022.

(51) Int. Cl.
*E01F 15/00*   (2006.01)
*B65G 41/00*   (2006.01)

(52) U.S. Cl.
CPC .......... *E01F 15/006* (2013.01); *B65G 41/008* (2013.01)

(58) Field of Classification Search
CPC ............ B65G 67/12; B65G 2814/0311; B65G 41/008; E01F 15/006; E01F 15/10
USPC ........................................................ 198/300
See application file for complete search history.

(56) References Cited

U.S. PATENT DOCUMENTS

| | | | |
|---|---|---|---|
| 5,253,951 A * | 10/1993 | Peek | E01F 15/006 404/9 |
| 5,885,046 A * | 3/1999 | Peek | E01F 15/006 414/460 |
| 6,220,780 B1 | 4/2001 | Schindler et al. | |
| 8,834,062 B1 | 9/2014 | Schmidt | |
| 11,332,168 B2 | 5/2022 | Wyatt et al. | |
| 11,472,644 B2 | 10/2022 | Provaznik et al. | |
| 2006/0239804 A1 | 10/2006 | Trescott | |
| 2024/0026620 A1* | 1/2024 | Seguin | E01F 15/083 |

FOREIGN PATENT DOCUMENTS

CN  107139897  * 9/2017

OTHER PUBLICATIONS

International Search Report and Written Opinion in related PCT Application PCT/US2023/024109 mailed Sep. 15, 2023, 10 pages.

* cited by examiner

*Primary Examiner* — Gene O Crawford
*Assistant Examiner* — Lester Rushin, III
(74) *Attorney, Agent, or Firm* — HOVEY WILLIAMS LLP

(57) ABSTRACT

A barrier transfer machine includes an electrically powered capstan system with regenerative braking/tensioning. The regenerative braking/tensioning recaptures energy when electric motors are forced to turn by passing barriers while no power, or reduced power, is applied to the electric motors.

20 Claims, 16 Drawing Sheets

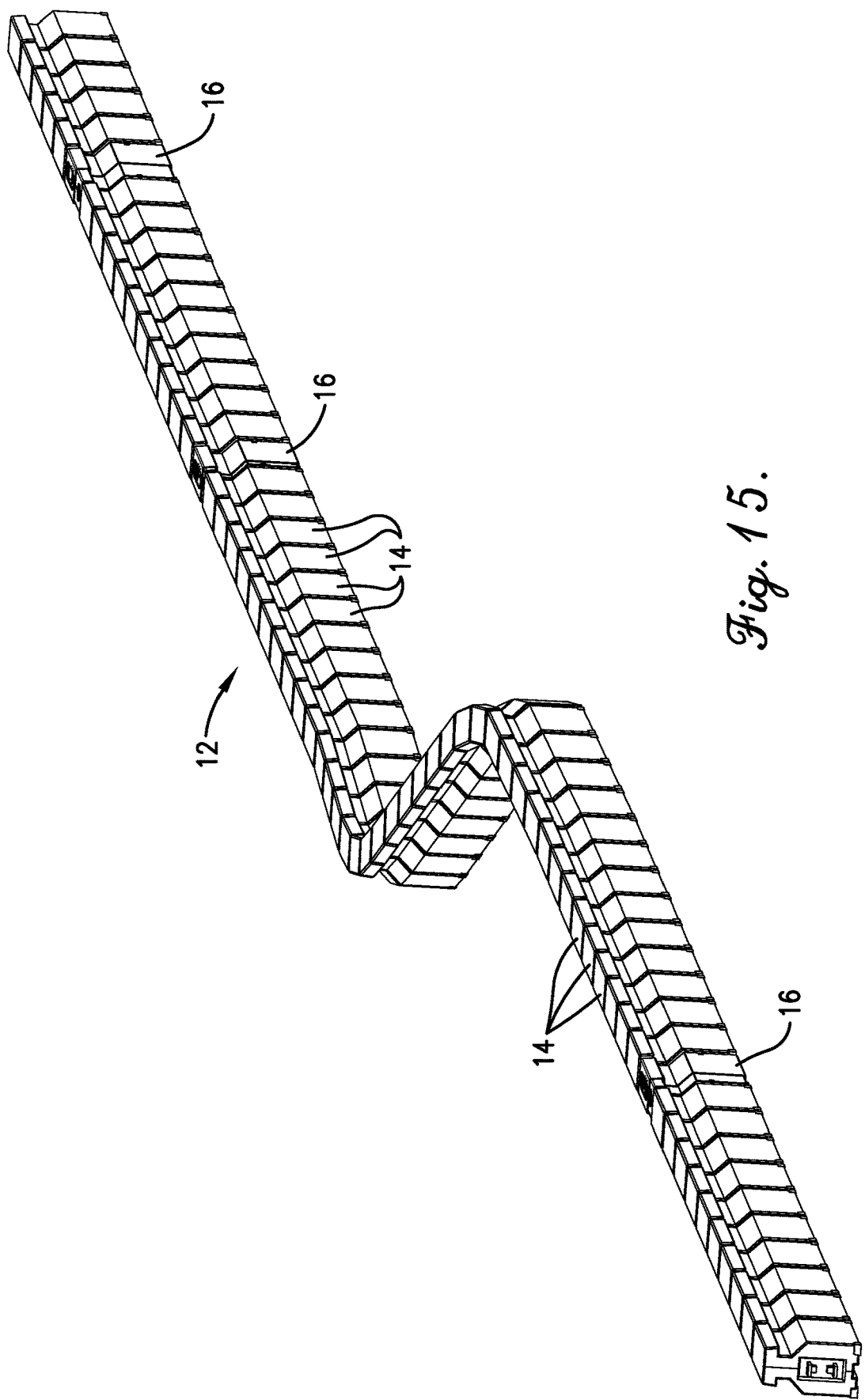

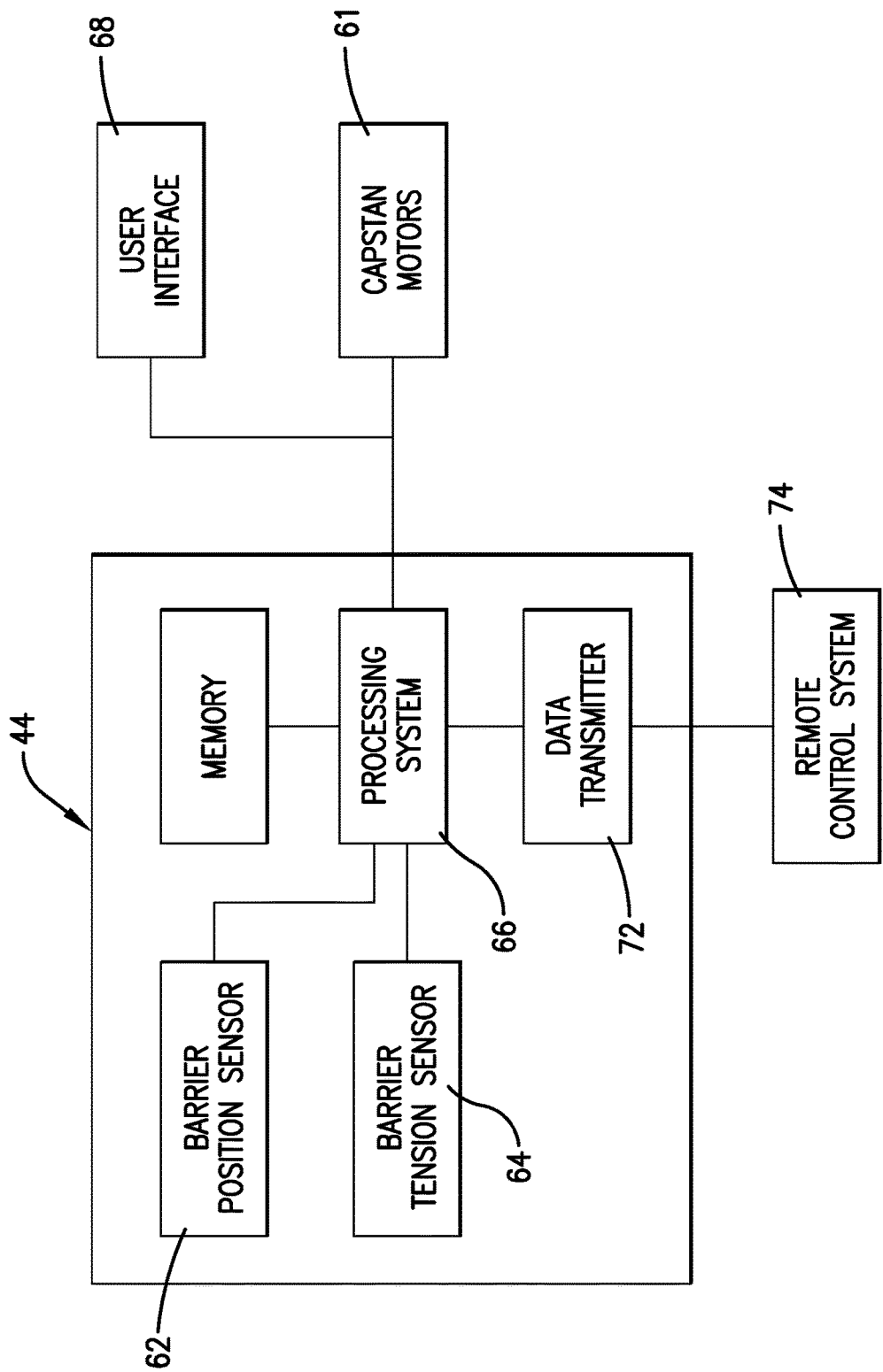

ELECTRICALLY-OPERATED BARRIER TRANSFER MACHINE

RELATED APPLICATION

The present non-provisional application claims priority benefit to U.S. Provisional Patent Application Ser. No. 63/347,593, filed on Jun. 1, 2022, and entitled "ELECTRICALLY OPERATED BARRIER TRANSFER MACHINE." The entirety of the above-identified patent application is hereby incorporated by reference into the present non-provisional patent application.

BACKGROUND

Moveable road barrier systems are often placed on roadways to create traffic barriers between opposing lanes of traffic. Unlike permanent barriers, movable road barrier systems may be picked up and repositioned by barrier transfer machines to make more efficient use of space, increase vehicle capacity, and reduce traffic congestion. For example, a barrier transfer machine may move a road barrier system back and forth between lanes of a roadway to provide more lanes in directions of peak traffic and/or to create work zone space for construction crews.

Typical barrier transfer machines are powered by one or more internal combustion engines. Such engines are inefficient, loud, difficult to precisely control, and produce harmful pollution.

SUMMARY

The present invention solves the above-described problems and related problems and provides a distinct advance in the art of road barrier transfer machines. More particularly, the invention provides a road barrier transfer machine powered by one or more electrically operated motors. The barrier transfer machine also comprises a capstan system with regenerative braking/tensioning.

A barrier transfer machine constructed in accordance with an embodiment of the invention broadly comprises a moveable chassis with electric motors, an entry snout, an exit snout, a conveyor system, and an electrically powered capstan system with regenerative braking/tensioning.

The chassis has two ends and rides on wheels, belts, or other ground-engaging traction elements that are driven by one or more electrically operated motors powered by one or more batteries. The machine can be driven in either direction. In one embodiment, two operator cabs are supported on the chassis, one at each end of the chassis, but embodiments of the machine may have only one operator cab or even no cab at all. As used herein, the end of the machine currently picking up barriers is referred to as the "forward end" or "front end", and the end of the machine placing the barriers back down is referred to as the "rear end".

Either snout can pick up and drop off barriers, depending on the direction of travel of the machine. As used herein, the snout currently in front is referred to as the "entry snout", and the snout currently in the back is referred to as the "exit snout".

The entry and exit snouts include a blunderbuss that acts as a guide for the barriers as they enter or exit the machine and a number of bogey assemblies with carrier wheels that pickup and carry the barriers towards the conveyor or place the barriers back down after being conveyed through the machine. An entry snout positioning mechanism is coupled with the entry snout for shifting the entry snout generally laterally with respect to the longitudinal axis of the chassis.

The conveyor system extends beneath the chassis and transports the road barriers from the entry snout to the exit snout.

The capstan system is mounted alongside the conveyor system and adjusts the tension or compression in the road barrier span while it is being transported by the conveyor system in an attempt to keep the barrier span in its original longitudinal location relative to the road. An embodiment of the capstan system comprises a pair of capstan wheels on each side of the conveyor system, hydraulic cylinders, linkages, or other mechanisms for urging the wheels against the road barriers as they pass by, and electric motors and pumps for driving the wheels so as to apply varying forward and rearward pressures on the road barriers. The capstan system works by clamping the barriers with the capstan wheels as they pass by on the conveyor system and applying either forward or backward rotational pressure on the barriers. This alleviates excessive tension or compression in the span to reduce barrier migration and/or to reposition the barriers relative to one another.

In accordance with an important aspect of the present invention, the capstan system also provides regenerative braking/tensioning. The regenerative braking/tensioning recaptures energy when the electric motors driving the capstan wheels are forced to turn by the passing barriers while no power, or reduced power, is applied to the electric motors. For example, when the barrier transfer machine travels up a grade, the capstan system must apply counter torque to the barriers to counteract gravity's influence on the barriers as the barriers are lifted off the ground. No power or reduced power is delivered by the electric motors to the capstan wheels to slow or brake the capstan wheels, causing the capstan wheels to apply forward rotational pressure on the barriers. The passing barriers counterrotate the electric motors and causes the motors to function as generators, thus inverting the direction of current flow between the batteries and the motors to recharge the batteries.

In some embodiments, the recaptured electricity from the capstan motors recharges the batteries that drive the motors as described above. In other embodiments, the recaptured electricity charges a supercapacitor that may supplement the batteries during very high electricity demands. For example, when the barrier transfer machine is traveling downhill and the capstan wheels must apply more rotational torque to the barriers to maintain their spacing while they are lifted off the ground, the supercapacitor may discharge its stored electricity to the capstan motors to supplement the electricity from the batteries. In still other embodiments, the electric motors are connected to other electricity-consuming devices in or on the barrier transfer machine to power such devices whenever regenerative braking/tensioning is occurring.

In accordance with important aspects of the invention, a control system may detect when the barriers are in tension or compression and control the capstan wheel motors and the associated regenerative braking/tensioning.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 15 is a perspective view of an exemplary road barrier span.

FIG. 16 is a block diagram depicting components of a control system of the barrier transfer machine.

Figure 1:
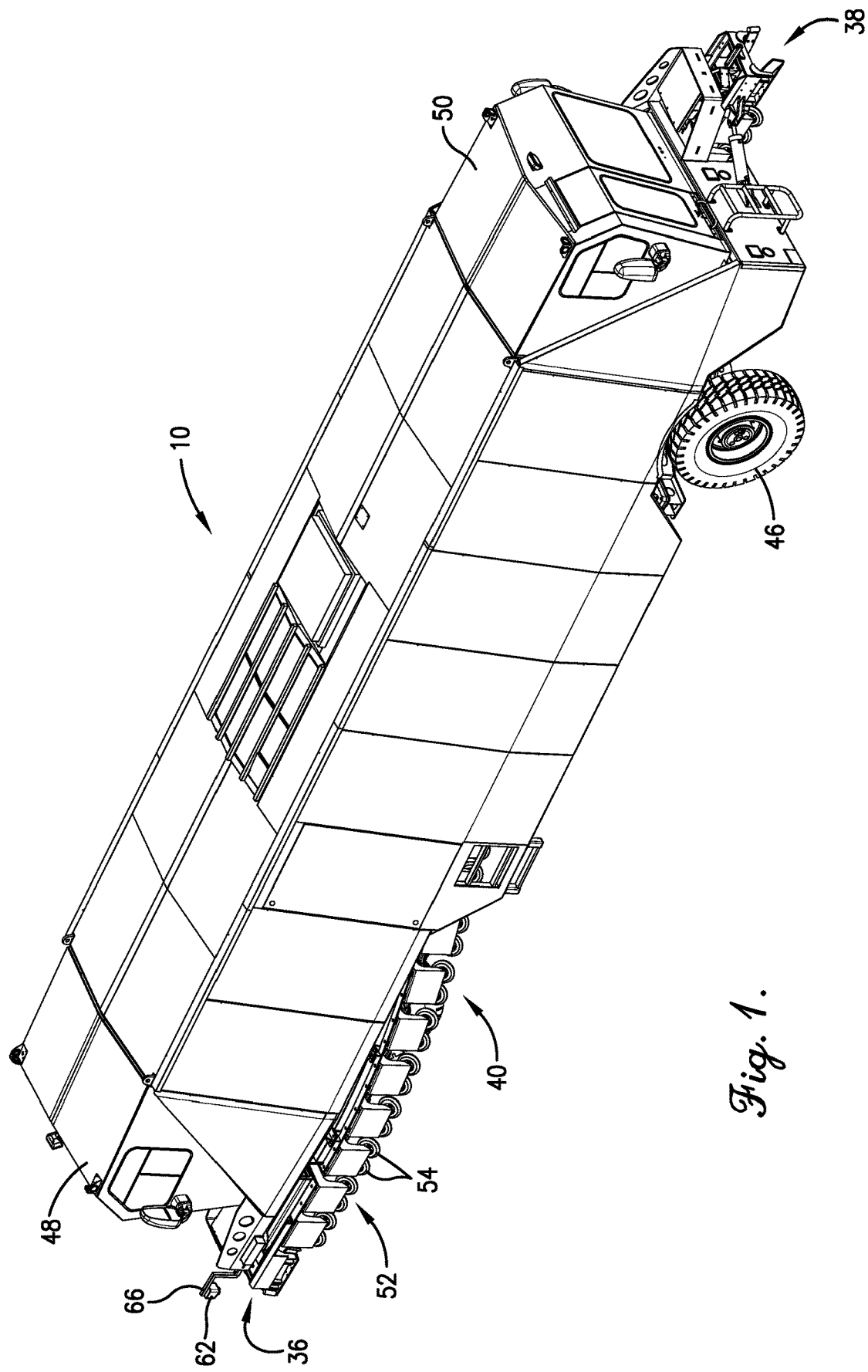
FIG. 1 is a top perspective view of a barrier transfer machine constructed in accordance with embodiments of the present invention.
Figure 2:
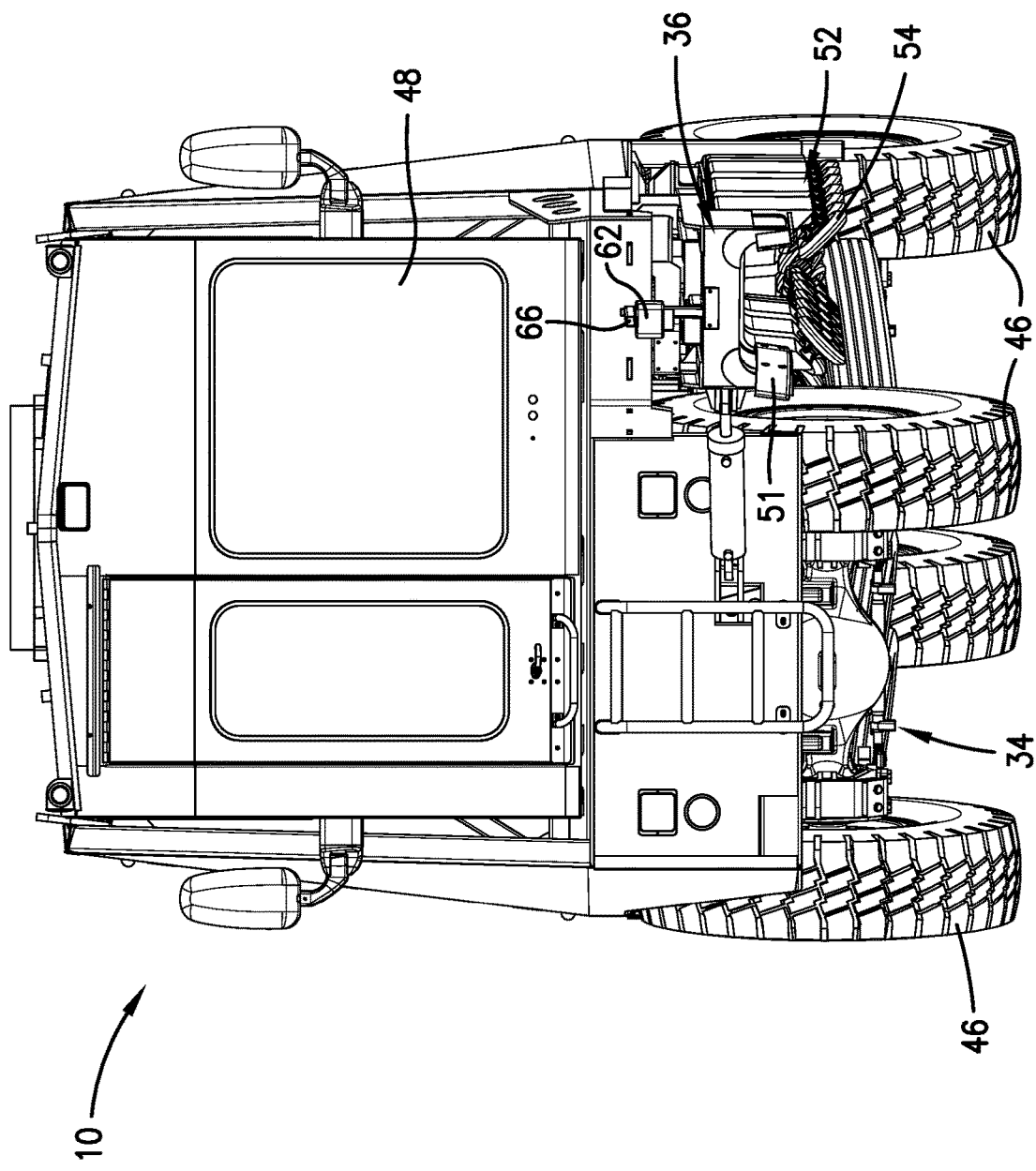
FIG. 2 is a front or rear view of the barrier transfer machine.
Figure 3:
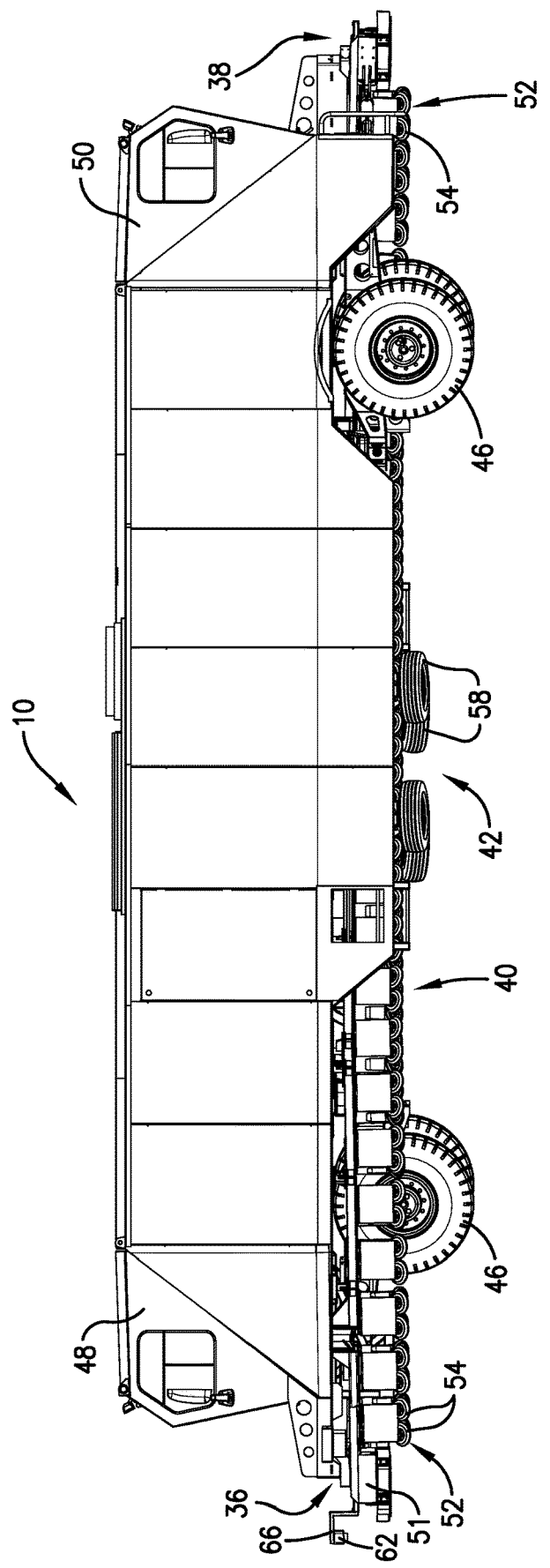
FIG. 3 is a side view of the barrier transfer machine.
Figure 4:
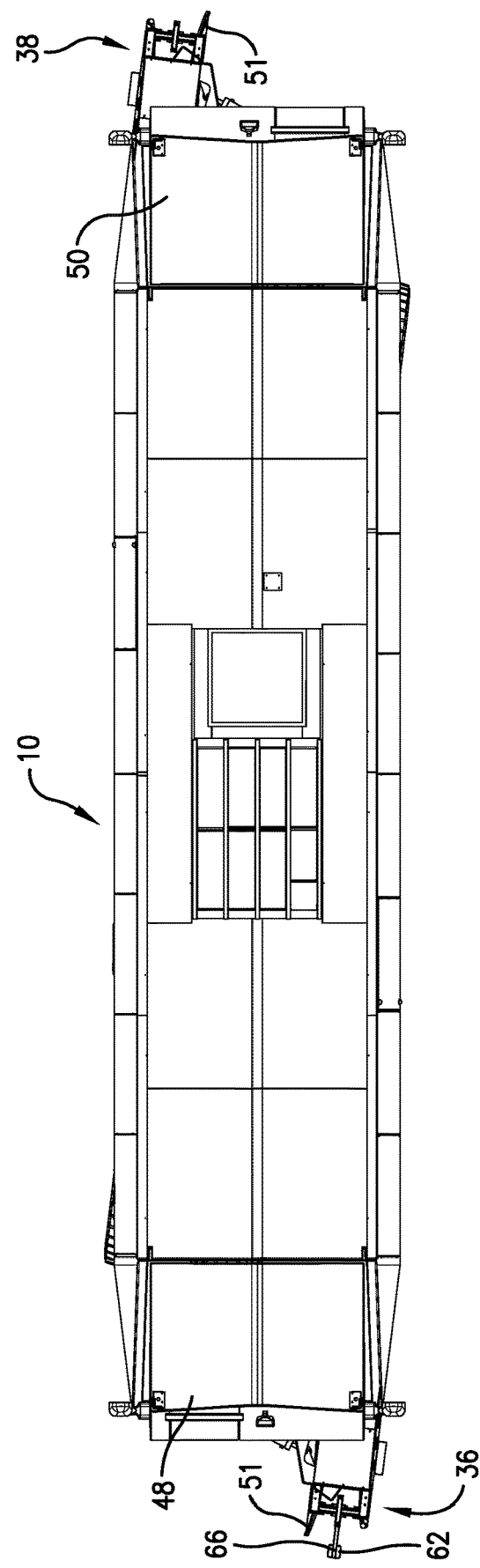
FIG. 4 is a top view of the barrier transfer machine.

The drawing figures do not limit the present invention to the specific embodiments disclosed and described herein. The drawings are not necessarily to scale, emphasis instead being placed upon clearly illustrating the principles of the invention.

DETAILED DESCRIPTION

Figure 6:
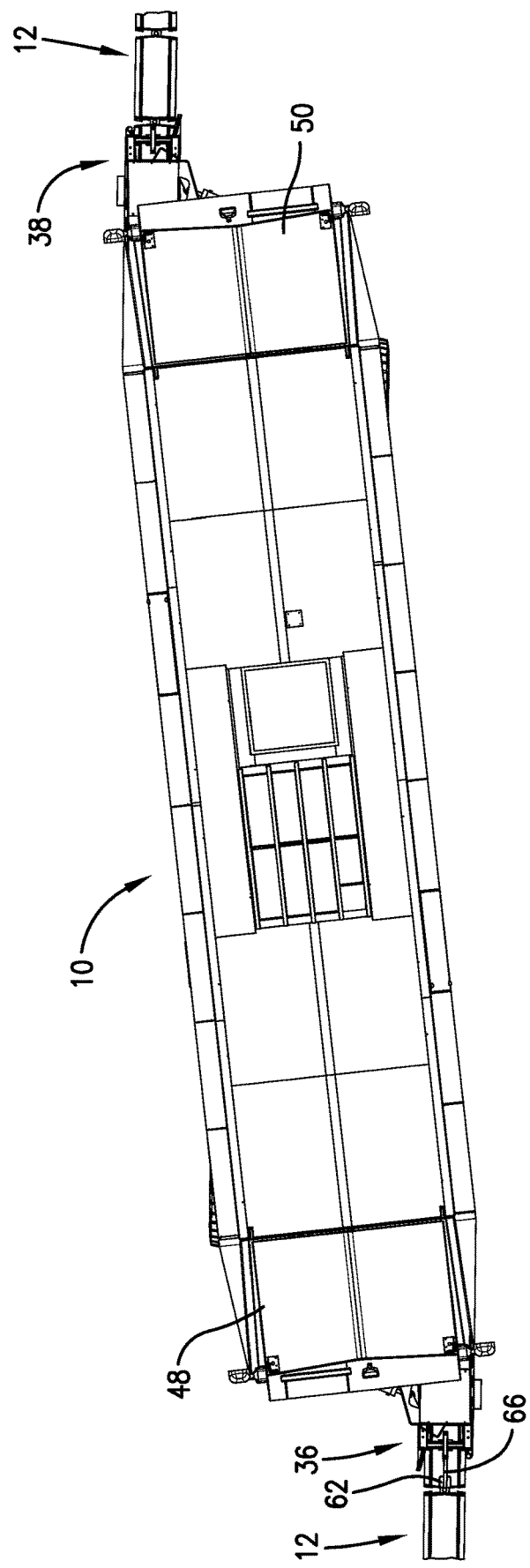
FIG. 6 is a top view of the barrier transfer machine shown moving a road barrier span from one side of a roadway to another side.
Figure 7:
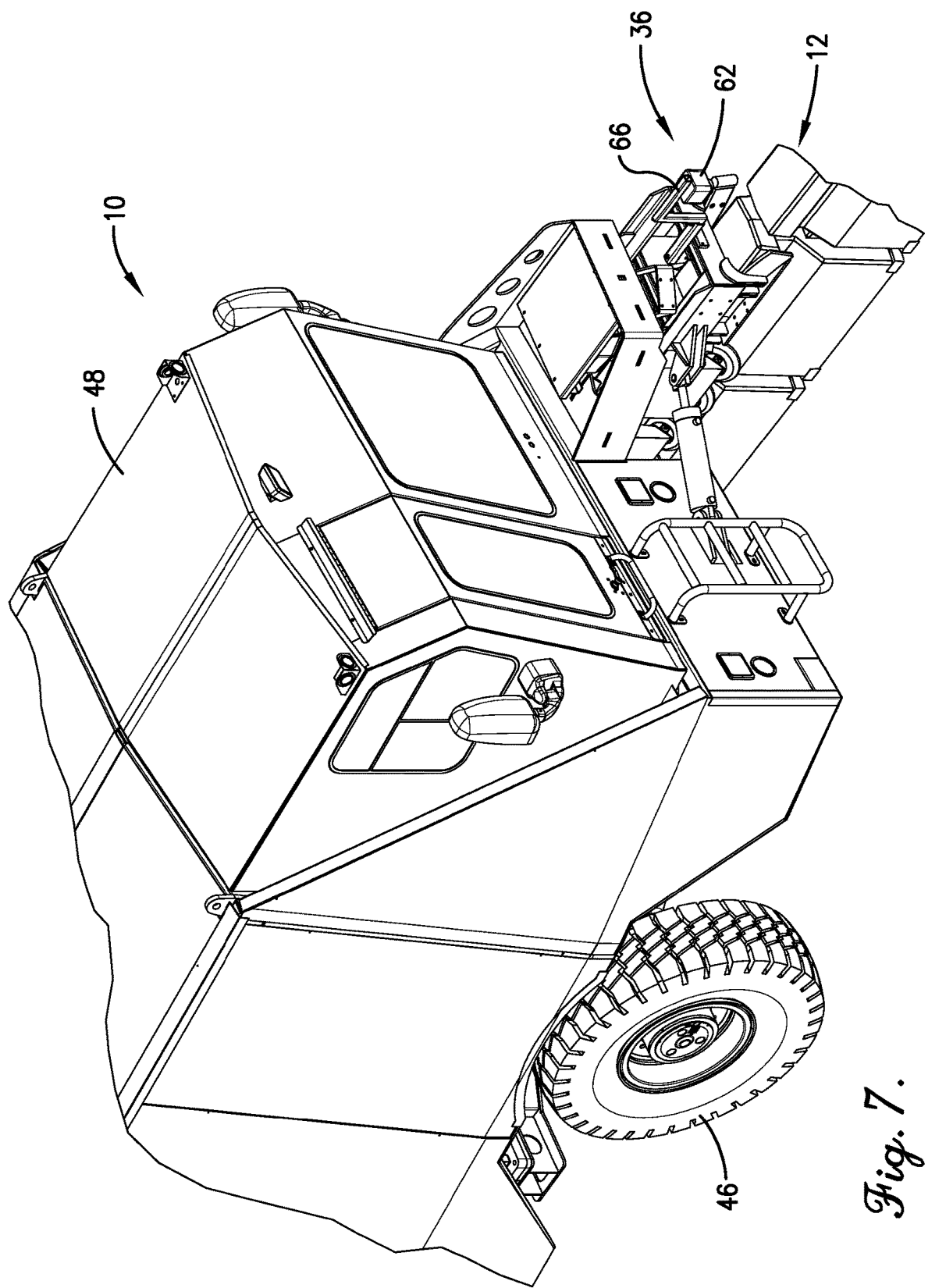
FIG. 7 is a fragmentary front perspective view of the barrier transfer machine shown picking up a span of road barriers.
Figure 8:
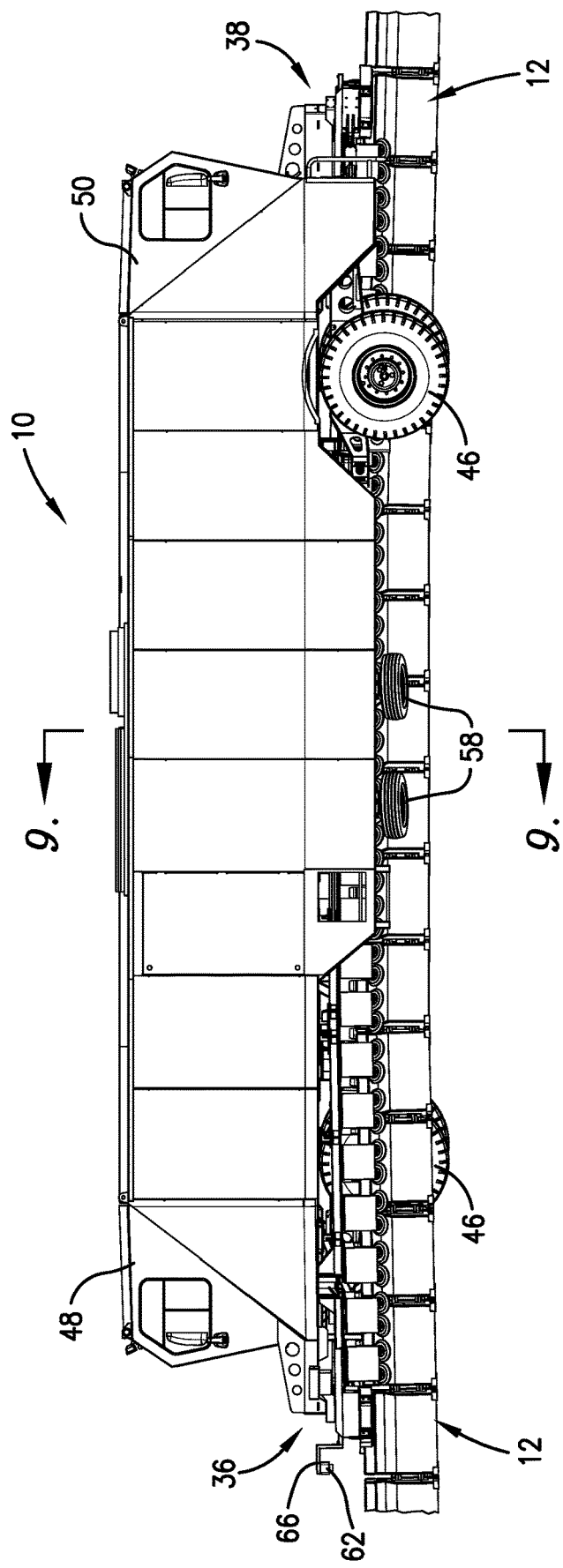
FIG. 8 is a side view of the barrier transfer machine shown picking up and repositioning a span of road barriers.

Turning now to the drawing figures, a barrier transfer machine 10 constructed in accordance with embodiments of the invention is depicted. As best shown in FIG. 6, the barrier transfer machine 10 is configured for picking up and repositioning a span 1 of interconnected road barriers 12 to provide more lanes in directions of peak traffic, to create work zone space for construction crews, or to otherwise make more efficient use of roadway space, increase vehicle capacity, and/or reduce traffic congestion. In accordance with important aspects of the present invention, and as described in more detail below, the barrier transfer machine is driven by one or more electric motors and includes regenerative braking/tensioning and a control system for managing the regenerative braking/tensioning.

An exemplary span of road barriers 12 that may be picked up and repositioned by the barrier transfer machine 10 is depicted in FIG. 15. The span 12 may be any length and may include any number of fixed-length road barriers 14 and variable length barriers 16. In some embodiments, the barriers 14 and 16 are connected end-to-end with steel pins and/or tensioning hinge mechanisms described in more detail below.

Figure 9:
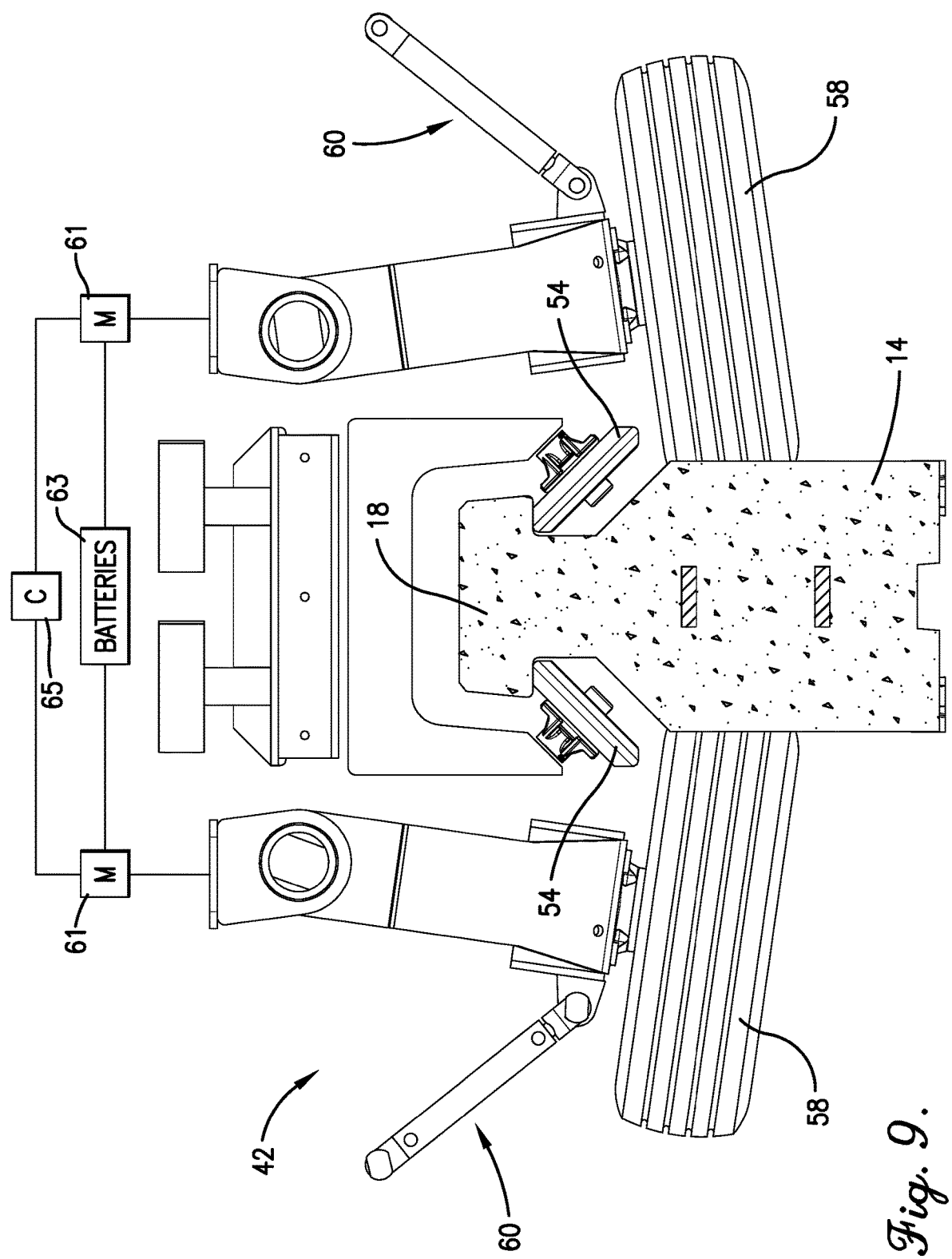
FIG. 9 is a vertical cross-sectional view of the barrier transfer machine taken along line 9/9 of FIG. 8 to better illustrate the capstan system.
Figure 10:
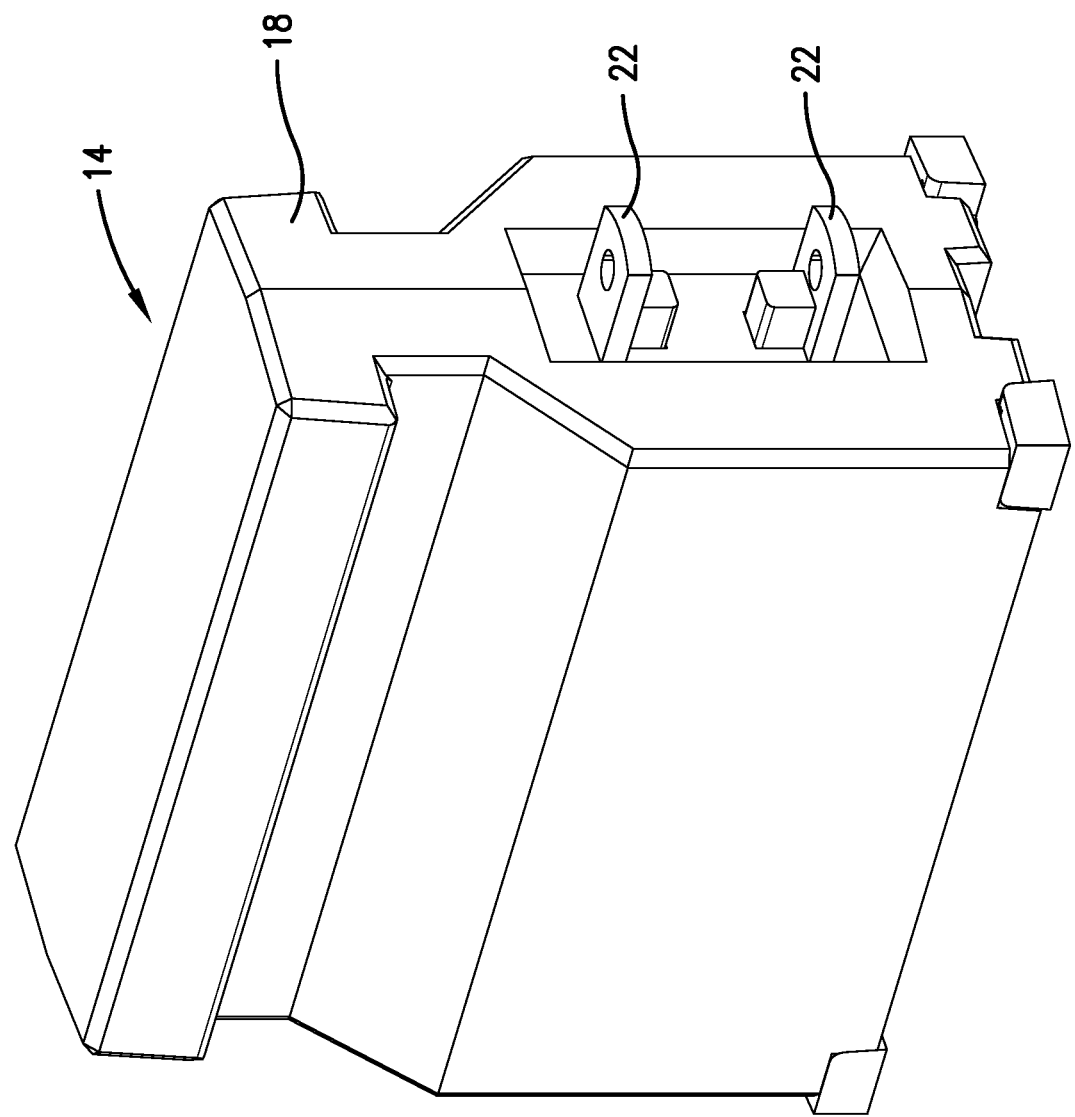
FIG. 10 is a right side perspective view of a fixed road barrier.
Figure 11:
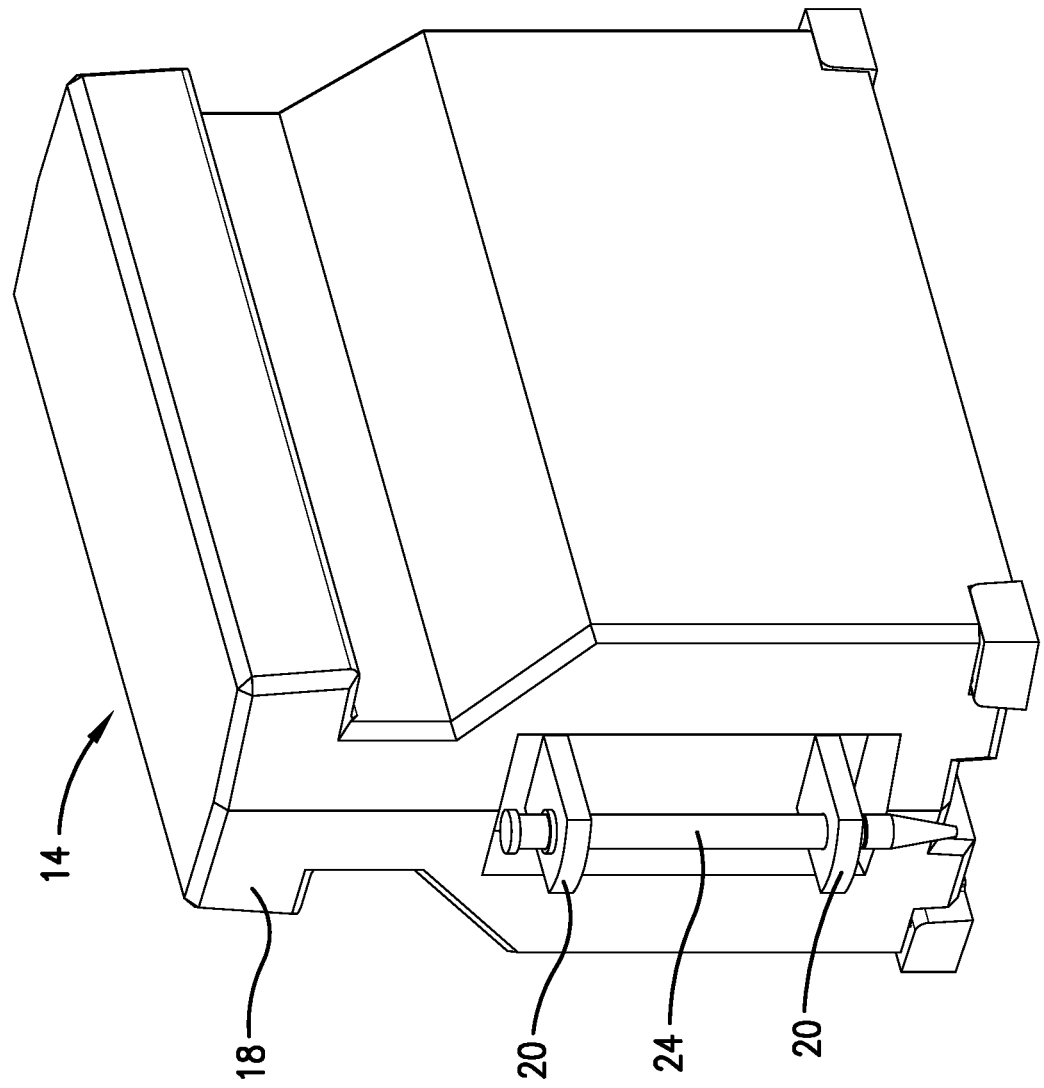
FIG. 11 is a left side perspective view of the fixed road barrier.

Examples of the fixed length barriers 14 are shown in FIGS. 10 and 11. The barriers 14 may be any type, shape, and size and may be formed of any suitable materials such as heavily reinforced concrete or high strength steel frames filled with concrete. In one embodiment, the barriers 14 have T-shaped tops 18 so they can be picked up and repositioned by bogey wheels of the barrier transfer machine as shown in FIG. 9 and described below.

Returning to FIGS. 10 and 11, one side of each barrier 14 includes fixed, spaced apart, connection flanges 20, and the opposite side includes spaced apart, spring biased, reactive tension elements 22. A steel rod 24 may be inserted through holes in the flanges 20 and tension elements 22 of adjacent barriers when they are aligned to interconnect the adjacent barriers. The reactive tension elements 22 allow adjacent barriers to move longitudinally relative to one another when the barriers are under tension or compression. In other embodiments, the fixed length barriers may not have reactive tension elements, but instead may have larger holes in the connection flanges that create "sloppy hinges" to accommodate some longitudinal movement between adjacent barriers.

Figure 12:
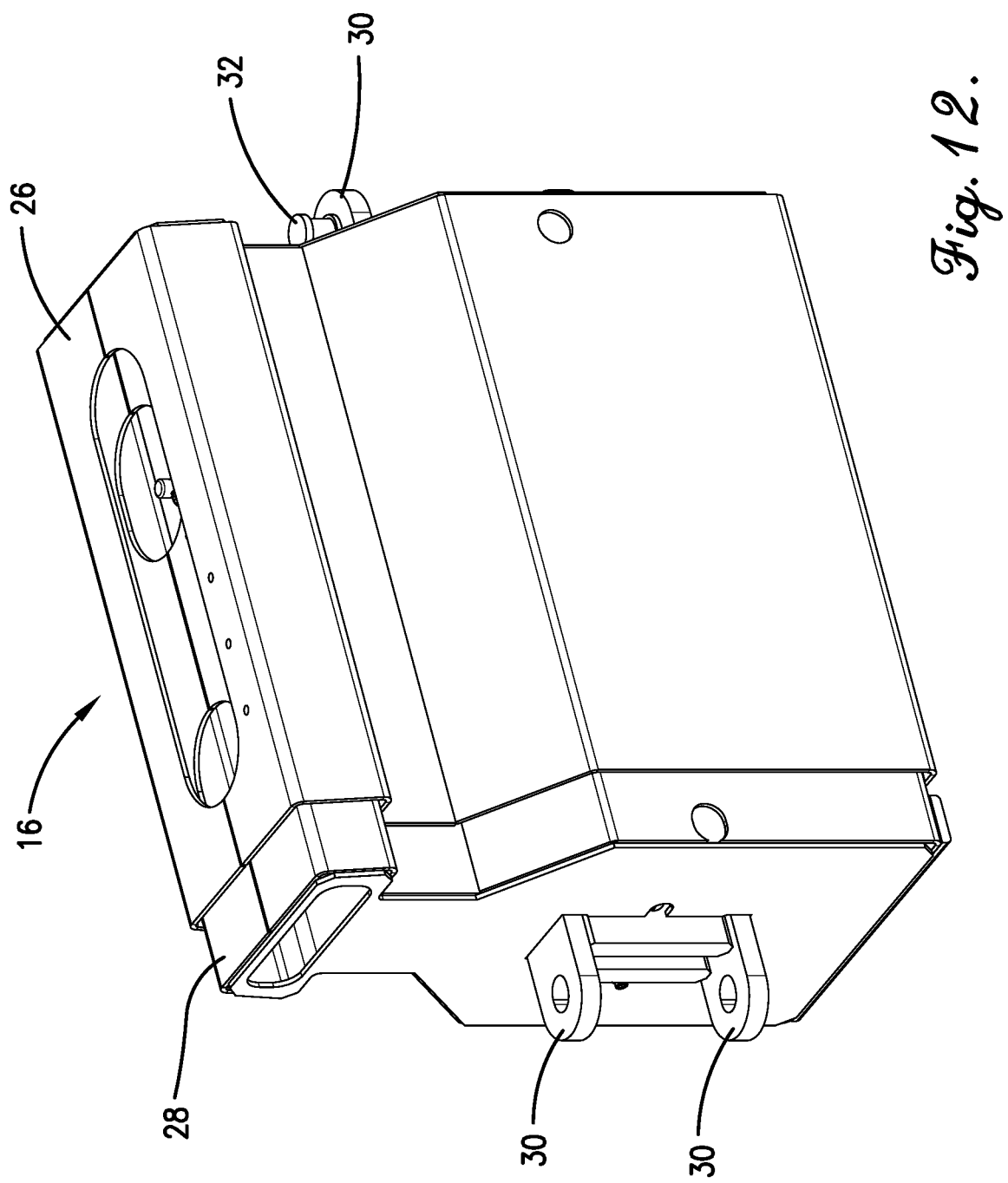
FIG. 12 is a perspective view of a variable length road barrier shown in its retracted position.
Figure 13:
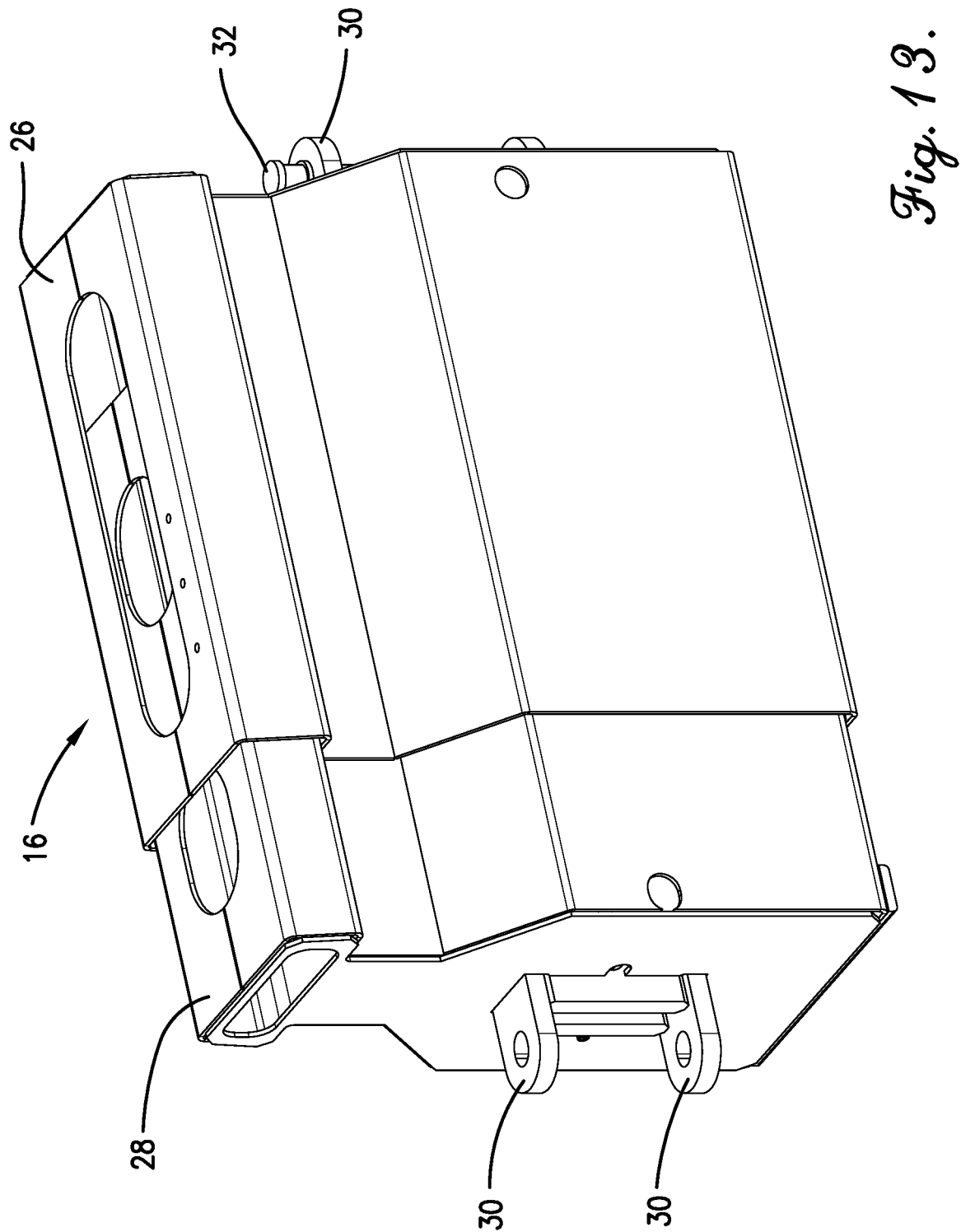
FIG. 13 is a perspective view of the variable length road barrier shown in its mid-stroke or neutral position.
Figure 14:
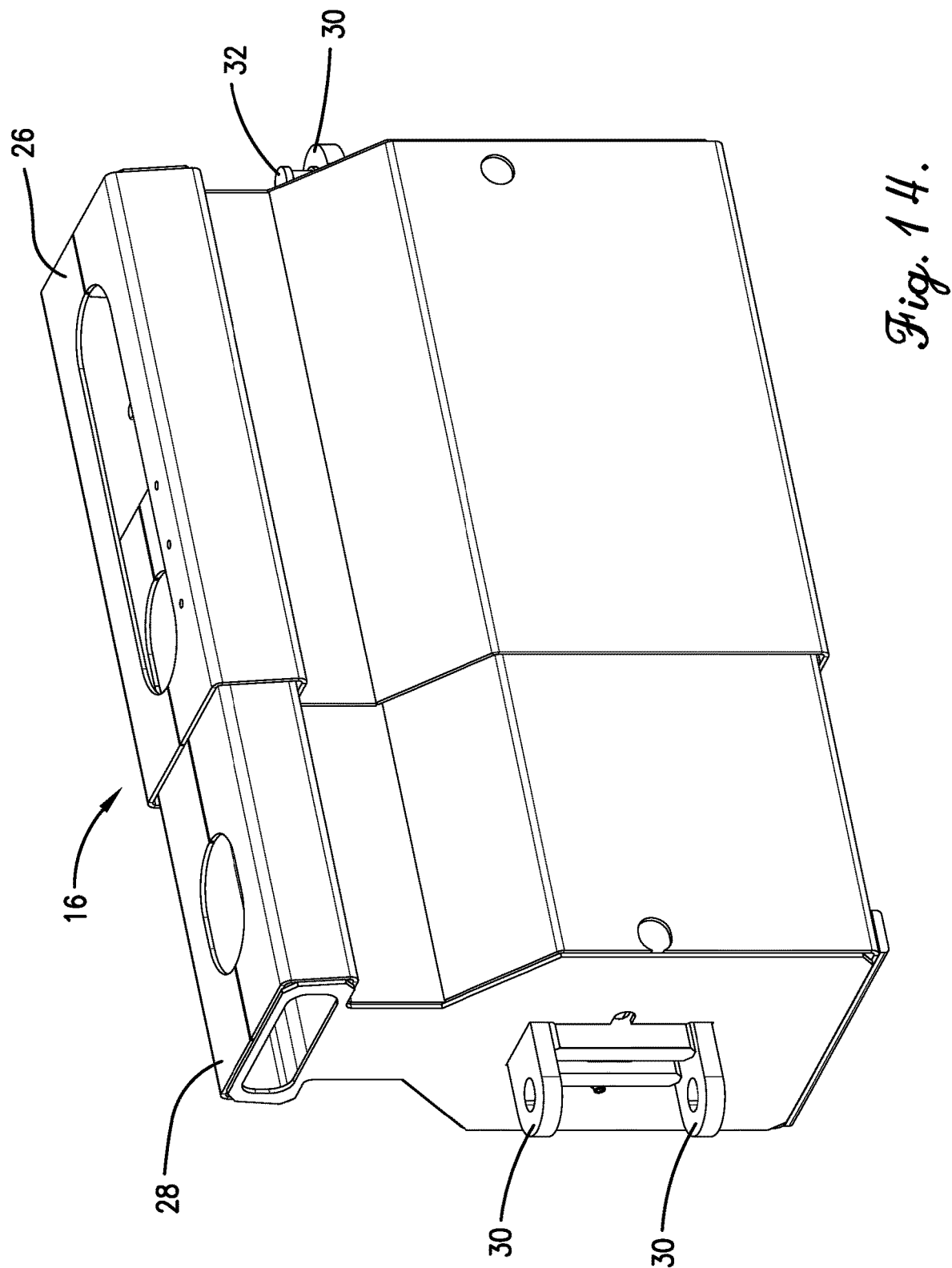
FIG. 14 is a perspective view of the variable length road barrier shown in its fully extended position.

Examples of the variable length barriers 16 are shown in FIGS. 12-14. The barriers may be any shape and size and each has an outer frame 26 and an inner telescoping structure 28 that may move in and out of the outer frame 26 when the barrier is subjected to tension or compression forces. The variable length barriers also include connection flanges 30 that may be aligned with and interconnected to the connection flanges of adjacent barriers with a steel rod 32. Movement of the telescoping inner structure 28 is resisted by internal hydraulic cylinders or other hydraulic or spring mechanisms.

FIG. 12 shows a variable length barrier 16 in its fully retracted or compressed state when subjected to a compressive force of a magnitude sufficient to fully compress the hydraulic cylinders or other biasing mechanisms. FIG. 14 shows the barrier 16 in its fully extended state when subjected to a tension force of a magnitude sufficient to fully extend the hydraulic cylinders or other biasing mechanisms. FIG. 13 shows the barrier in its neutral or steady state when it is not subjected to a compressive or tension force. More details of exemplary embodiments of variable length barriers are disclosed in U.S. Pat. No. 6,439,802, which is incorporated into the present application by reference in its entirety.

Aspects of the barrier transfer machine 10 will now be described in more detail with reference to FIGS. 1-9 and 16. An embodiment of the barrier transfer machine 10 broadly comprises a moveable chassis 34, an entry snout 36, an entry snout positioning mechanism 37, an exit snout 38, a conveyor system 40, a capstan system 42, and a control system 44.

The chassis 34 has a forward end and a rearward end disposed along a generally longitudinal axis that is essentially parallel to a roadway over which the machine is driven. The chassis 34 rides on wheels 46, belts, or other ground-engaging traction elements that are driven by one or more electric motors powered by one or more rechargeable batteries.

In one embodiment, the barrier transfer machine 10 is equipped with two cabs 48, 50, one at each end of the chassis 34. The machine 10 can be driven in either direction, but typically only one operator in one of the cabs can be in charge of the key controls at any one time. Usually, the cab in control is the cab at the end of the machine pointing towards the direction in which the machine is traveling. In some embodiments, the barrier transfer machine 10 may include various sensors and controls that provide autonomous operation without direct operator control or semi-autonomous operation with some operator control.

The entry snout 36 is mounted on a front end of the chassis and is configured for picking up the road barrier span from a first location on a road surface. Likewise, the exit snout 38 is mounted on the rear end of the chassis for placing the span back onto the road surface in a second location different from the first location. The snouts 36, 38 act as guides for the road barriers as they are picked up and/or dropped off and can be moved and adjusted by operators of the machine to align the snouts with the incoming road barriers and the desired placement positions. Each snout 36, 38 includes a blunderbuss assembly 51 and an array of bogey assemblies 52. Each bogey assembly 52 comprises a number of carrier wheels 54 that pick up, carry, and/or lay down the barriers depending on the direction of travel of the machine.

The entry snout positioning mechanism 37 is shown schematically in FIG. 16 and is operable to shift the entry snout 36 laterally from side-to-side with respect to the longitudinal axis of the machine 10 so as to align the entry snout with the barriers before they are picked up. An embodiment of the entry snout positioning mechanism 37 may include linear actuators, hydraulic cylinders, electric motors, or other mechanisms or combinations of mechanisms for shifting the blunderbuss 51 of the entry snout from side-to-side. In some embodiments, the entry snout positioning mechanism 37 may be controlled by a joystick or other control system in one or both the cabs of the machine. In other embodiments, the entry snout positioning mechanism may be controlled automatically or by a remote operator.

Figure 5:
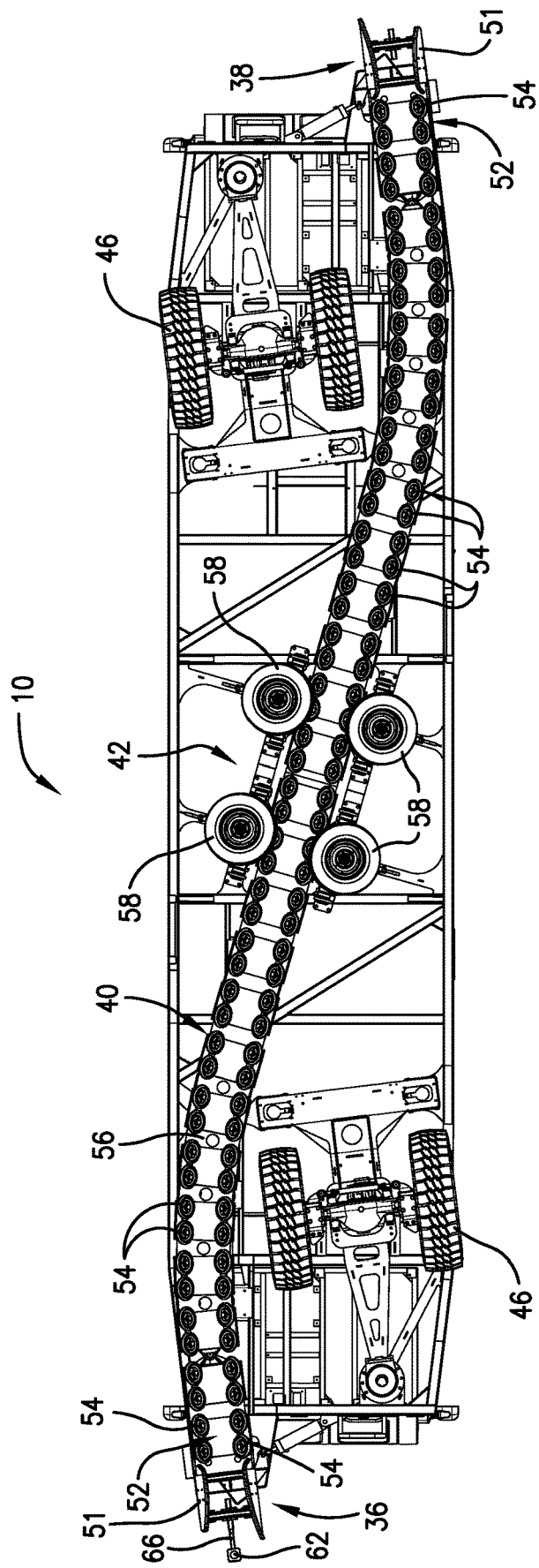
FIG. 5 is a bottom view of the barrier transfer machine.

The conveyor system 40 extends beneath the barrier transfer machine and is configured for transporting the span of road barriers from the entry snout 36 to the exit snout 38. The conveyor system 40 may be comprised of multiple assemblies and sections including straight sections, turn sections, and pickup/laydown sections connected to the snouts 36, 38. As best shown in FIG. 5, an embodiment of the conveyor system 40 comprises an S-shaped or otherwise curved structural frame 56 attached to the bottom of the machine and an array of bogey assemblies 52 supported to the frame. Each bogey assembly 52 comprises a number of carrier wheels 54 that pick up and carry the barriers through the machine during a barrier transfer operation.

The capstan system 42 is mounted alongside the conveyor system 40 and adjusts the tension or compression in the road barrier span 12 while it is being transported by the conveyor system in an attempt to keep the barrier span in its original longitudinal location relative to the road. As best shown in FIGS. 5 and 9, an embodiment of the capstan system 42 comprises a pair of large capstan wheels 58 on each side of the conveyor system, hydraulic cylinders, linkages, or other mechanisms 60 for urging the wheels against the road barriers as they pass by, and electric motors 61 and/or pumps for driving the wheels so as to apply varying forward and rearward pressures on the road barriers. The electric motors are powered by one or more rechargeable batteries 63. The capstan system 42 works by clamping the barriers with the capstan wheels 58 as they pass by on the conveyor system 42 and applying either forward or backward rotational pressure on the barriers via the motors 61. This alleviates excessive tension or compression in the span to reduce barrier migration and/or to reposition the barriers relative to one another.

In accordance with an important aspect of the present invention, the capstan system 42 also provides regenerative braking/tensioning. The regenerative braking/tensioning recaptures energy when the electric motors 61 are forced to turn by the passing barriers while no power, or reduced power, is applied to the electric motors. For example, when the barrier transfer machine travels up a grade, the capstan system must apply counter torque to the barriers to counteract gravity's influence on the barriers as the barriers are lifted off the ground. No power or reduced power is delivered by electric motors 61 to the capstan wheels 58 to slow or brake the capstan wheels, causing the capstan wheels 58 to apply forward rotational pressure on the barriers. This counterrotates the electric motors 61 and causes the motors to function as generators, thus inverting the direction of current flow between the batteries 63 and the motors 61 to recharge the batteries.

In some embodiments, the recaptured electricity recharges the batteries 63 as described above. In other embodiments, the recaptured electricity charges a supercapacitor 65 that may supplement the batteries during very high electricity demands. For example, when the barrier transfer machine is traveling downhill and the capstan wheels must apply more rotational torque to the barriers to maintain their spacing while they are lifted off the ground, the supercapacitor may discharge its stored electricity to the capstan motors to supplement the electricity from the batteries. In still other embodiments, the electric motors are connected to other electricity-consuming devices in or on the barrier transfer machine to power such devices whenever regenerative braking/tensioning is occurring.

In accordance with important aspects of the invention, a control system 44 may detect when the barriers are in tension or compression and control the capstan wheel motors and the associated regenerative braking/tensioning. An embodiment of the control system 44 is shown in FIG. 16 and broadly comprises one or more barrier position sensors 62; one or more barrier tension sensors 64; and a processing system 66. The control system 44 may be a stand-alone system or may be incorporated in other control systems of the barrier transfer machine.

Each barrier position sensor 62 senses a position of at least one of the road barriers 12 before the road barrier is picked up by the entry snout 36 and generates corresponding barrier position data. In some embodiments, the barrier position sensor is a light detection and ranging (LIDAR) sensor and/or a radio detection and ranging (RADAR) sensor mounted on an extension arm 66 that extends forward of the entry snout. In other embodiments, the barrier position sensor 62 may be a camera mounted on the entry snout or any other device or mechanism operable to sense the position or relative position of at least one of the barriers and generate corresponding position data. As used herein, the "position" of the barrier may be its geographical coordinates, its relative position with respect to the entry snout, and/or its angle with respect to the entry snout.

Each barrier tension sensor 64 senses tension or compression between at least two of the road barriers 12 before or after the road barriers are picked up by the entry snout 36 and generates corresponding data. In some embodiments, the tension sensors may be strain gauges, load cells, torque sensors or any device capable of measuring the tension or compression between adjacent barriers.

The processing system 66 is coupled with the barrier position sensor 62 and barrier tension sensor 64 by wired or wireless connections and receives and analyzes the sensor data to determine if the barriers are in tension or compression. In some embodiments, the processing system 66 generates and transmits a control signal to control the motors 61 and their associated regenerative braking/tensioning. For example, if the processing system determines the barriers are excessively tensioned or compressed, it may operate the capstan motors 61 and wheels 58 to alleviate the excessive tension or compression and to trigger the associated regenerative braking/tensioning.

The control system 44 may also comprise a data transceiver 72 for transmitting data to a remote control system 74 and for receiving control instructions and/or data from the remote control system. The data transceiver 72 may be any device capable of transmitting and receiving data via wired or wireless connections. The data transceiver may be, or include, a wired or wireless network adapter or a wireless data transceiver for use with Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMAX) and the like.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as the processing system 66, other processing elements, etc., may be implemented as special purpose or as general purpose. For example, the processing system 66 may comprise dedicated circuitry or logic that is permanently configured, such as an application-specific integrated circuit (ASIC), or indefinitely configured, such as an FPGA, to perform certain operations. The processing system 66 also comprise programmable logic or circuitry (e.g., as encompassed within a general-purpose processor or other programmable processor) that is temporarily configured by software to perform certain operations. It will be appreciated that the decision to implement the processing system as special purpose, in dedicated and permanently configured circuitry, or as general purpose (e.g., configured by software) may be driven by cost and time considerations.

Accordingly, the term "processing system" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing system is temporarily configured (e.g., programmed), each of the processing elements need not be configured or instantiated at any one instance in time. For example, where the processing system comprises a general-purpose processor configured using software, the general-purpose processor may be configured as respective different processing elements at different times. Software may accordingly configure the processing element to constitute a hardware configuration at one instance of time and to constitute a different hardware configuration at a different instance of time.

Computer hardware components, such as the processing system 66, associated memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, later, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims associated with any patent application related to this application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention.

The invention claimed is:

1. A barrier transfer machine for picking up and repositioning road barriers, the barrier transfer machine comprising:
    a moveable chassis having a forward and a rearward end disposed along a generally longitudinal axis;
    an entry snout supported on the forward end of the chassis for picking up the road barriers from a road surface;
    an exit snout for placing the road barriers back onto the road surface;
    a conveyor system positioned between the entry snout and the exit snout for transporting the road barrier from the entry snout to the exit snout; and
    a capstan system that adjusts the tension or compression in the road barriers while the road barriers are transported by the conveyor system, the capstan system including an electric motor powered by one or more rechargeable batteries and a regenerative braking/tensioning system for recharging the rechargeable batteries.

2. The barrier transfer machine as set forth in claim 1, the capstan system further including a pair of capstan wheels on opposite sides of the conveyor system.

3. The barrier transfer machine as set forth in claim 2, the capstan system further including a mechanism for urging the capstan wheels against the road barriers as the road barriers pass by the capstan wheels.

4. The barrier transfer machine as set forth in claim 3, wherein the electric motor drives the capstan wheels to provide rearward rotational pressure on the barriers.

5. The barrier transfer machine as set forth in claim 4, wherein the electric motor is driven by the capstan wheels and operates as a generator to recharge the rechargeable batteries when the capstan wheels provide forward rotational pressure on the barriers.

6. The barrier transfer machine as set forth in claim 5, the capstan system further comprising a supercapacitor that is charged by the regenerative braking/tensioning system when the electric motor is driven by the capstan wheels.

7. The barrier transfer machine as set forth in claim 6, wherein the supercapacitor provides power to the electric motor when the electric motor drives the capstan wheels.

8. The barrier transfer machine as set forth in claim 7, further comprising a control system for detecting when the barrier transfer machine is travelling downhill and, in response, discharging the supercapacitor to the electric motor.

9. The barrier transfer machine as set forth in claim 6, wherein the rechargeable batteries and the supercapacitor provide power to electrical components of the barrier transfer machine other than the electric motor.

10. A barrier transfer machine for picking up and repositioning road barriers, the barrier transfer machine comprising:
    a moveable chassis having a forward and a rearward end disposed along a generally longitudinal axis;
    an entry snout supported on the forward end of the chassis for picking up the road barriers from a road surface;
    an exit snout for placing the road barriers back onto the road surface;
    a conveyor system positioned between the entry snout and the exit snout for transporting the road barrier from the entry snout to the exit snout; and
    a capstan system that adjusts the tension or compression in the road barriers while the road barriers are transported by the conveyor system, the capstan system including:
        a pair of capstan wheels on opposite sides of the conveyor system,
        a mechanism for urging the capstan wheels against the road barriers as the road barriers pass by the capstan wheels,
        a pair of electric motors, each for driving one of the capstan wheels, to provide rearward rotational pressure on the barriers,
        one or more rechargeable batteries for powering the electric motors, and a regenerative braking/tensioning system for recharging the rechargeable batteries when the electric motors are driven by the capstan wheels.

11. The barrier transfer machine as set forth in claim 10, the capstan system further comprising a supercapacitor that is charged by the regenerative braking/tensioning system when the electric motor is driven by the capstan wheels.

12. The barrier transfer machine as set forth in claim 11, wherein the supercapacitor provides power to the electric motors when the electric motors are driving the capstan wheels to provide rearward rotational pressure on the barriers.

13. The barrier transfer machine as set forth in claim 12, further comprising a control system for detecting when the barrier transfer machine is travelling downhill and, in response, discharging the supercapacitor to the electric motors.

14. The barrier transfer machine as set forth in claim 12, wherein the rechargeable batteries and the supercapacitor provide power to electrical components of the barrier transfer machine other than the electric motor.

15. A method of operating a barrier transfer machine for picking up and repositioning road barriers, the method comprising:
  picking up the road barriers from a road surface with an entry snout supported on a forward end of a chassis;
  transporting the road barrier from the entry snout to an exit snout with a conveyor system positioned between the entry snout and the exit snout;
  adjusting the tension or compression in the road barriers with a capstan system while the road barriers are transported by the conveyor system, the adjusting step including:
    urging capstan wheels against the road barriers as the road barriers pass by the capstan wheels,
    driving the capstan wheels with an electric motor to provide rearward rotational pressure on the barriers when the barriers are under compression,
    powering the electric motor with one or more rechargeable batteries while the electric motor drives the capstan wheels,
    driving the electric motor with the capstan wheels to provide forward rotational pressure on the barriers when the barriers are under tension,
    recharging the rechargeable batteries with the electric motor when the electric motor is driven by the capstan wheels.

16. The method as set forth in claim 15, further comprising charging a supercapacitor with the electric motor when the electric motor is driven by the capstan wheels.

17. The method as set forth in claim 16, further comprising powering the electric motor with the super capacitor while the electric motor drives the capstan wheel.

18. The method as set forth in claim 17, further comprising detecting when the barrier transfer machine is travelling downhill.

19. The method as set forth in claim 18, further comprising discharging the supercapacitor to the electric motor when the barrier transfer machine is travelling downhill.

20. The method as set forth in claim 17, further comprising powering electrical components of the barrier transfer machine other than the electric motor with the rechargeable batteries and the supercapacitor.

\* \* \* \* \*